US012668920B2

(12) United States Patent
Vanhala

(10) Patent No.: US 12,668,920 B2
(45) Date of Patent: Jun. 30, 2026

(54) ACCEPT TANK MIXING ARRANGEMENT

(71) Applicant: ANDRITZ OY, Helsinki (FI)

(72) Inventor: Kimmo Vanhala, Kotka (FI)

(73) Assignee: ANDRITZ OY, Helsinki (FI)

( * ) Notice: Subject to any disclaimer, the term of this patent is extended or adjusted under 35 U.S.C. 154(b) by 175 days.

(21) Appl. No.: 18/563,701

(22) PCT Filed: May 20, 2022

(86) PCT No.: PCT/FI2022/050344
§ 371 (c)(1),
(2) Date: Nov. 22, 2023

(87) PCT Pub. No.: WO2022/248765
PCT Pub. Date: Dec. 1, 2022

(65) Prior Publication Data

US 2024/0229352 A1 Jul. 11, 2024

(30) Foreign Application Priority Data

May 25, 2021 (FI) ..................................... 20215615

(51) Int. Cl.
*D21B 1/34* (2006.01)
*B01F 27/71* (2022.01)
(Continued)

(52) U.S. Cl.
CPC .............. *D21B 1/342* (2013.01); *B01F 27/71* (2022.01); *B01F 35/50* (2022.01); *D21D 5/28* (2013.01);
(Continued)

(58) Field of Classification Search
CPC .......... D21B 1/342; B01F 35/50; B01F 27/71; B01F 2101/47; B01F 2215/0422; B01F 2215/0427; B01F 2215/0431; D21D 5/28
See application file for complete search history.

(56) References Cited

U.S. PATENT DOCUMENTS 2,661,668 A 12/1953 Gruen
4,325,642 A * 4/1982 Kratky .................... D21D 5/28 366/279

(Continued)

FOREIGN PATENT DOCUMENTS

CN 108330719 A 7/2018

OTHER PUBLICATIONS

International Search Report for PCT/FI2022/050344, mailed Aug. 9, 2022, 4 pages.

(Continued)

*Primary Examiner* — Abbas Rashid
*Assistant Examiner* — Stephen M Russell
(74) *Attorney, Agent, or Firm* — Nixon & Vanderhye P.C.

(57) ABSTRACT

An accept tank arrangement for mixing of pulped fiber suspension including sidewalls (3,4) including opposite arched ends (2) and an elongated section (1) between the arched ends (2). The accept tank has mixers (10) each located within one of the arched ends (2). The mixers (10) have axles (11) on which are mounted propellers (12). The mixers (10) are aligned horizontally and each axle points to a respective point on the elongated section (1) of the sidewall (3) which away from an end of the elongate section by at least 25% of the length of the elongated section (1). The propellers (12) are symmetrically positioned with respect to a center-point of the accept tank. Within the center of the elongated section is an elongated centerpiece (6) having rounded ends. The accept tank has a substantially flat bottom at least at the elongated section (1) of the accept tank.

20 Claims, 1 Drawing Sheet

Figure 1:
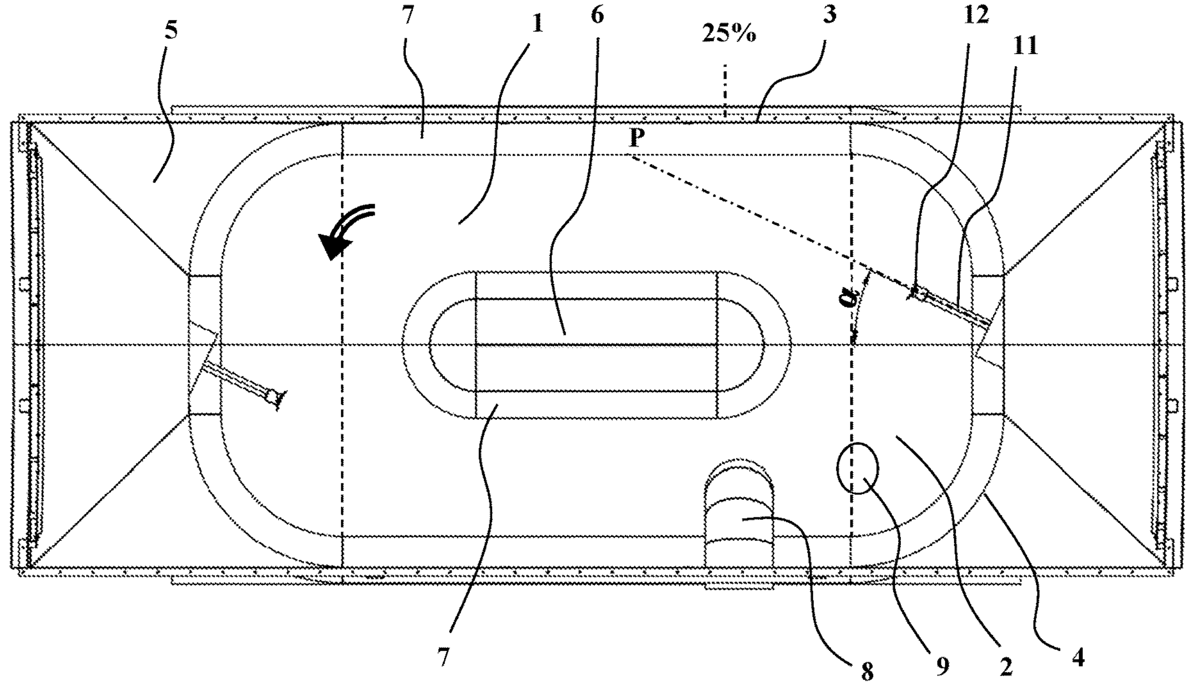

(51) Int. Cl.
*B01F 35/50* (2022.01)
*D21D 5/28* (2006.01)
*B01F 101/47* (2022.01)

(52) U.S. Cl.
CPC ... *B01F 2101/47* (2022.01); *B01F 2215/0422* (2013.01); *B01F 2215/0427* (2013.01); *B01F 2215/0431* (2013.01)

(56) References Cited

U.S. PATENT DOCUMENTS

| | | | | |
|---|---|---|---|---|
| 2006/0021916 | A1* | 2/2006 | Hess | D21F 1/70 209/164 |
| 2009/0223873 | A1* | 9/2009 | Mueller | D21D 5/04 209/17 |
| 2020/0406502 | A1* | 12/2020 | Koppelaar | B28C 7/067 |

OTHER PUBLICATIONS

Written Opinion of the ISA for PCT/FI2022/050344, mailed Aug. 9, 2022, 5 pages.

* cited by examiner

ACCEPT TANK MIXING ARRANGEMENT

RELATED APPLICATION

This application is the U.S. national phase of International Application PCT/FI2022/050344, filed May 20, 2022, which designated the U.S. and claims priority to Finnish patent application FI 20215615 filed May 25, 2021, the entire contents of each of which are hereby incorporated by reference.

SCOPE OF THE INVENTION

The invention is an arrangement for mixing of suspension within an accept tank which has a form of two opposite arched ends and an elongated section between the arched ends. Especially, the invention is aimed for mixing of pulped fiber suspension of cellulosic fibers from recycled material.

BACKGROUND OF THE INVENTION

Accept tanks are used in papermaking industry for mixing screened fibers and small particles that are supplied from a drum pulper. The accept tank is placed under a last screen section of the drum pulper. The tank may or may not aim to separate heaviest particles like sand or glass to the bottom of the tank.

Publication CN108330719 discloses an arrangement wherein propulsion of mixers is aligned so that it aims against sidewalls of arched ends of the tank.

SUMMARY OF THE INVENTION

Least energy consumption is best achieved by sufficiently stable and coherent circular flow within the accept tank. Often separation of the particles is not wanted to happen in the accept tank, as it can be better performed within later phases with least fiber loss. Then mixing conditions should keep the particles flowing mixed with the liquid and prevent precipitation. A strong coherent and stable flow is desired. Local backflow, swirl and standing water will cause accumulations of particles to the bottom of the tank. Accumulations may grow and destabilize flow which will further grow the accumulations. Then the process should be occasionally stopped for removal of the accumulations. Simulations and practice have revealed that prior art positions and alignments of propellers of mixers within an accept tank will create excess turbulence, differently flowing areas and even counterflows within the tank.

The object of the invention is to achieve best mixing results with least energy consumption and least precipitation of particles within an accept tank. These and other objects that will be apparent from the following summary and description are achieved by the accept tank arrangement according to the appended claims.

An accept tank for mixing of pulped fiber suspensions has a form of two opposite arched ends having curved sidewalls and an elongated section between the arched ends having two opposite sidewalls. The tank has an accept outlet and it may have a reject outlet. The accept tank has at least two mixers and at least one of the mixers are located within the arched end. The mixers have propellers at ends of their axles. At least two of the mixers should have an axle which horizontally points to the direction of the elongated section. The axles should point to the same side of the tank when looked from the arched end where the mixer is attached. The center line of at least one axle of a mixer is aimed at a point, which is at the sidewall of the elongated section at least 25% of the length away from the beginning of the elongated section. Advantageously the length of the tank is 1,5 to 2 times longer than is the width of the tank for best flow conditions. The propellers of the mixers should have a diameter which is from 10% to 20% of the width of the tank for creating suitable sized wide flow.

Preferably the number of the mixers is two as the number of mixers also raises manufacturing and operation costs. One mixer is not adequate for the purpose. Preferably the propellers are positioned and/or aligned symmetric with respect to the centerpoint of the accept tank. In simulations, the feature that the axle is angled away from the centerline to point to the sidewall of the elongated section, creates most evenly distributed speed of flow within the tank. At least the said axle of the mixer which points at the sidewall of the elongated section should point to the other side of the tank than the side where the accept outlet is located. For best flowing properties, the propeller at the end of the at least one axle should be located within the arched end. The location and position of the accept outlet may affect to the flow, so that the optimum position and alignment of the propeller at that side may differ from the optimum alignment for the other propeller at other side of the accept tank.

Advantageously within the center of the elongated section is an elongated centerpiece, which has a length which is at least 50% of the length of the elongated center section. Then there would not be standing water and turbulences between the different direction of flows at the centerline of the tank. Preferably, the elongated centerpiece has rounded ends and a width which is less than 30% of the width of the elongated center section. The tank should have an essentially flat bottom at least within the elongated section of the tank. So, even though it has slanted or concave bottom, variation of depth should be below 5% of the length of the elongated section. Quite flat bottom prevents particles accumulating within the area.

Advantageously at least a part of the accept outlet is positioned in flow direction at least partially at the end half of the elongated section and/or within the arched end opposite to the side of the mixer. A reject outlet is preferably located at bottom of at least at one of one the ached ends of the tank. The reject outlet is preferably positioned in flow direction after the accept outlet within the same elongated section or at the next arched end.

LIST OF DRAWINGS

Figure 2:
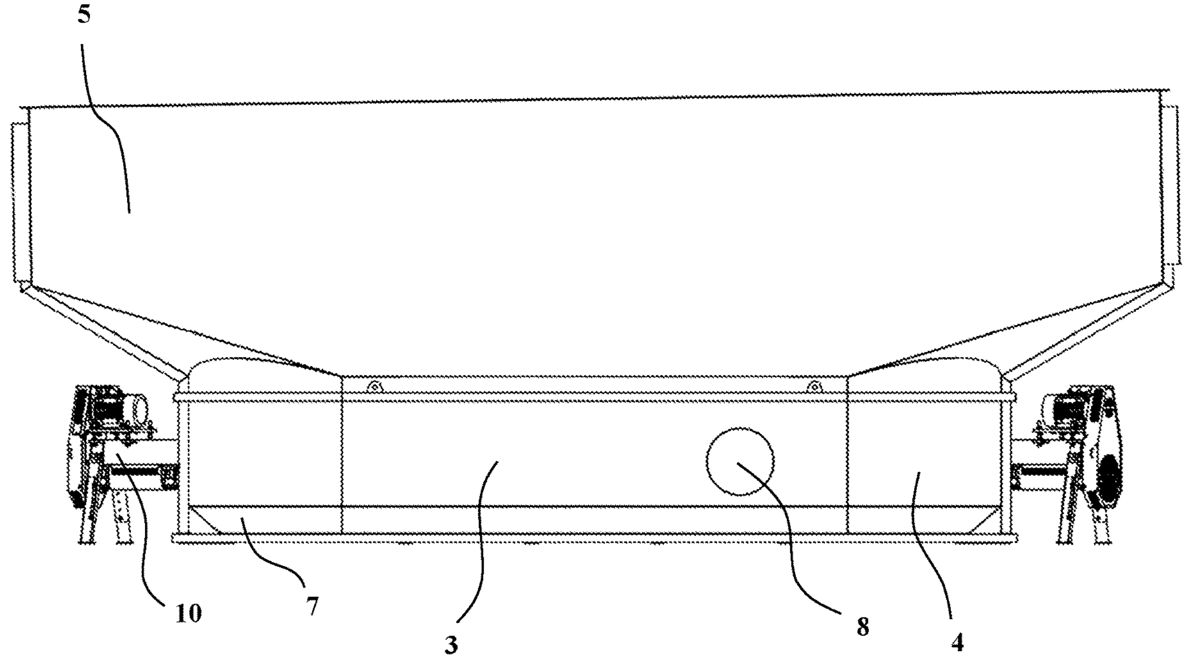

The invention will be described in more detail with reference to the appended drawings in which:

FIG. 1 illustrates a top view of an embodiment of an accept tank arrangement and FIG. 2 illustrates a side view of the accept tank arrangement.

DETAILED DESCRIPTION OF THE INVENTION

FIG. 1 illustrates a top view of an embodiment of an accept tank arrangement and FIG. 2 illustrates a side view of the accept tank arrangement. An accept tank is usually placed under a screened end part of a drum pulper, which processes wastepaper or other fibrous material. Suspension of pulped fibers and small particles drop through the screen to the accept tank directly or flow down along a funnel part 5 surrounding the tank. The accept tank preferably has a substantially flat bottom at least at central elongated section 1 The elongated section 1 has sidewalls 3 which are normally vertical and straight. The sidewall 3 may also be longitudinally curved, preferably outwards in order to create an oval form of the tank. At both ends of the tank are arched ends 2 which have vertical arched sidewalls 4. A straight section may exist between two arched sidewall 4 sections. The arched corner sections ensure that the flow will smoothly circulate in and out of the arched ends 2. The bottom of the accept tank has preferably bevels 7 at all edges for avoiding steady water and precipitation of heaviest particles at the edges. The direction of the circular flow is marked with an arrow in. FIG. 1.

Preferably an elongated centerpiece 6 is positioned within the middle of the elongated section 1 for preventing interaction between right and left direction flows. For best flow properties, both ends of the elongated centerpiece 6 are rounded. The elongated centerpiece should have enough width in order to minimize turbulence at the ends of it, where the circular flow will turn to another side of the tank. Preferred width of the elongated centerpiece 6 is between 10% to 30% of the width of the tank.

A mixer 10 normally comprises an electric motor, a gearbox, and an axle 11 with a propeller 12 at the end of the axle 11. The propeller 12 typically creates propulsion flow away to the direction of the center line of the axle 11. Any other combinations that is illustrated may be used for the implementing the invention as the main effect is based on the initial position and direction of the propulsion flow. For example, a short propellor axle 11 and a 90 degrees gearbox like in outboard engines can be used instead. The propeller 12 may have a fan tube around it for best propulsion performance, but any stable crossflow obstacles should be avoided for avoiding accumulation of fibers around them.

Horizontal alignment a of at least one axle 11 of the mixer 10 is such that the centerline of the axle i.e. the thrust vector of the mixer is aimed at a point P, which is at the sidewall of the elongated section 1 at least 25% of the length of the elongated section 1 away from the beginning of the elongated section 1. More advantageously, the point P lies within 30 to 60% of the length of the elongated section 1 from the beginning of the elongated section 1. For best flowing properties, the propeller 12 at the end of the at least one axle 11 is located within the arched end 2. In principle, best flow properties are achieved, if the positions and alignments are symmetric with respect to the center-point of the tank. The horizontal alignment a of the at least one axle of the mixers is from 15 to 35 degrees and more preferably from 20 to 30 degrees from the longitudinal center line of the accept tank. Because an accept outlet 8 affects a bit to the flow, the propeller 12 at that side of the tank may be positioned and/or aligned differently depending of the position, dimensions and form of the accept outlet 8.

The accept outlet 8 is preferably positioned far away in flow direction from a propeller 12. The accept outlet 8 may be for example a downward curved tube. The accept outlet 8 tube may be profiled to have an optimized streamlined shape for least drag effect to the circular flow. If the tank has a reject outlet 9, it should be placed after the accept outlet 8, where the flow is slowest and most turbulent. Preferably the reject outlet 9 is located at least partially within the curved end 2. Any known design of a reject outlet 9 with conveying means can be used. Some suitable examples of reject outlets are disclosed in publication CN108330719.

An accept outlet 8 is preferably positioned far away in flow direction from a propeller 12. The accept outlet 8 may be for example a downward curved tube. The accept outlet 8 tube may be profiled to have an optimized streamlined shape for least drag effect to the circular flow. If the tank has a reject outlet 9, it should be placed after the accept outlet 8, where the flow is slowest and most turbulent. Preferably the reject outlet 9 is located at least partially within the curved end 2. Any known design of a reject outlet 9 with conveying means can be used. Some suitable examples of reject outlets are disclosed in publication CN108330719.

The invention claimed is:

1. An accept tank arrangement for mixing of pulped fiber suspension, the accept tank arrangement comprising:
- an accept tank configured to receive the pulped fiber suspension and the accept tank comprises sidewalls including a first elongated sidewall and a second elongated sidewall on an opposite side of the accept tank from the first elongated sidewall, and a first arched sidewall end and a second arched sidewall end;
- an accept outlet in one of the first and second elongated sidewalls, wherein the accept outlet is configured to discharge accepts from the pulped fiber suspension,
- a first mixer configured to mix the pulped fiber suspension in the accept tank and the first mixer including a first axle driving a first propeller in a region within the tank boarded by the first arched sidewall end, wherein a first axis of the first axle projects through a first point on the first elongated sidewall no less than twenty-five percent (25%) of a length of the first elongated sidewall away from the first arched sidewall end,
- a second mixer configured to mix the pulped fiber suspension in the accept tank and the first mixer including a second axle driving a second propeller in a region within the tank boarded by the second arched sidewall end, wherein a second axis of the second axle projects through a second point on the second elongated sidewall no less than twenty-five percent (25%) of a length of the second elongated sidewall away from the second arched sidewall end, and
- a reject outlet configured to discharge rejects from the pulped fiber suspension from the accept tank and the reject outlet is proximate a bottom of the accept tank,
- wherein the first arched sidewall end is joined to first ends of each of the first and second elongated sidewalls,
- wherein the second arched sidewall end is jointed to second ends of each of the first and second elongate sidewalls, and the second ends are opposite to the first ends, and
- wherein the first and second arched sidewall ends each have a curvature greater than any curvature of the first and second elongated sidewalls.

2. The accept tank arrangement of claim 1, wherein the first axle is on a side of accept tank opposite a longitudinal center line of the accept tank from the accept outlet.

3. The accept tank arrangement of claim 1, wherein the first mixer and the second mixer are the only mixers in the accept tank.

4. The accept tank arrangement of claim 1, wherein the first and second propellers are arranged symmetrically about a center point of the accept tank.

5. The accept tank arrangement of claim 1, further comprising an elongated centerpiece aligned with a longitudinal centerline of the accept tank and extending upward from the bottom of the accept tank, wherein the elongated centerpiece has a length no less than 50% of the length of the first elongated sidewall.

6. The accept tank arrangement of claim 5, wherein the elongated centerpiece has rounded ends and a width no greater than 30% of a width of the accept tank.

7. The accept tank arrangement of claim 1, wherein the bottom of the accept tank includes a flat bottom region between each of the first and second elongated sidewalls, wherein a depth of the accept tank varies over the flat bottom region by less than 5% of the length of the first elongated sidewall.

8. The accept tank arrangement of claim 1, wherein the reject outlet is located at least partially at a bottom of the accept tank, is at an elevation below the accept outlet and is at least partially boarded by of the first and second arched sidewall ends.

9. The accept tank arrangement of claim 1, wherein at least a part of the accept outlet is at least one of: between the first elongated sidewall and second elongated sidewall, the accept outlet is proximate ends for the first and second elongated sidewalls, or the accept outlet is on a side of an elongated centerline of the accept tank opposite to the first or second propeller nearest the accept outlet.

10. The accept tank arrangement of claim 1, wherein the reject outlet is downstream of the accept outlet along a flow direction within the accept tank and adjacent the first or second elongated sidewall nearest the accept outlet.

11. The accept tank arrangement of claim 1, wherein the first axle and the second axle are each oriented in a horizontal plane at an angle in a range of 15 to 35 degrees from a longitudinal center line of the accept tank.

12. The accept tank arrangement of claim 11, wherein the range is 20 to 30 degrees.

13. The accept tank arrangement of any of claim 1, wherein a length of the accept tank is in a range of 1.5 to 2 times a width of the accept tank.

14. The accept tank arrangement of claim 1, wherein the first and second propellers each have a diameter in a range of 10% to 20% of a width of the accept tank.

15. An accept tank assembly for mixing of pulped fiber suspension, the accept tank comprising:

an accept tank with a bottom, wherein the accept tank is configured to receive the pulped fiber suspension;

sidewalls of the accept tank extending around a periphery of the bottom, the sidewalls including a first elongated sidewall, a second elongated sidewall opposite to the first elongated sidewall, a first arched sidewall end at first ends of the first and second elongated sidewalls and a second arched sidewall end at second ends of the first elongated sidewall and the second elongated sidewall, an accept outlet for the accept tank, wherein the accept outlet is configured to discharge accepts from the pulped fiber suspension in the accept tank;

a first mixer configured to mix the pulped fiber suspension in the accept tank and the first mixer includes a first axle driving a first propeller boarded by the first arched sidewall end, wherein a first axis of the first axle projects through a first point on the first elongated sidewall at least twenty-five percent (25%) of a total length of the first elongated sidewall away from the first arched sidewall end, and a second mixer configured to mix the pulped fiber suspension in the accept tank and the first mixer includes a second axle driving a second propeller in a region within the tank boarded by the second arched sidewall end, wherein a second axis of the second axle projects through a second point on the second elongated sidewall at least twenty-five percent (25%) of a total length of the second elongated sidewall away from the second arched sidewall end, and a reject outlet configured to discharge rejects from the pulped fiber suspension in the accept tank, wherein the reject outlet is at least partially in an end section of the bottom wherein the first and second arched sidewall ends each have a curvature greater than any curvature of the first and second elongated sidewalls.

16. The accept tank assembly of claim 15, further comprising an elongated centerpiece aligned with a longitudinal centerline of the accept tank and extending upward from the bottom, wherein the elongated centerpiece has a length no less than 50% of the length of the first elongated sidewall.

17. The accept tank assembly of claim 15, wherein the reject outlet is in the bottom, at an elevation below the accept outlet, and at least partially bordered by one of the first and second arched sidewall ends.

18. The accept tank assembly of claim 15, wherein the accept outlet is on a side of an elongated centerline of the accept tank opposite to the first or second propeller nearest the accept outlet.

19. The accept tank assembly of claim 15, wherein the first axle and the second axle are each oriented in a horizontal plane at an angle in a range of 15 to 35 degrees from a longitudinal center line of the accept tank.

20. The accept tank assembly of claim 15, wherein the first and second propellers each have a diameter in a range of 10% to 20% of a width of the accept tank.

* * * * *